United States Patent
Jagetiya et al.

(10) Patent No.: US 9,088,982 B2
(45) Date of Patent: Jul. 21, 2015

(54) BEACON FRAME DATA TRANSMISSION RATE ADJUSTMENT

(71) Applicant: QUALCOMM Incorporated, San Diego, CA (US)

(72) Inventors: Vikas Jagetiya, Bhilwara (IN); Rahul Jammula, Hyderabad (IN); Mohit Rajkumar Kothari, Ahmedabad (IN)

(73) Assignee: QUALCOMM Incorporated, San Diego, CA (US)

( * ) Notice: Subject to any disclaimer, the term of this patent is extended or adjusted under 35 U.S.C. 154(b) by 169 days.

(21) Appl. No.: 13/939,929

(22) Filed: Jul. 11, 2013

(65) Prior Publication Data

US 2015/0016281 A1 Jan. 15, 2015

(51) Int. Cl.
*H04W 72/04* (2009.01)
*H04W 48/06* (2009.01)

(52) U.S. Cl.
CPC .......... *H04W 72/0446* (2013.01); *H04W 48/06* (2013.01)

(58) Field of Classification Search
None
See application file for complete search history.

(56) References Cited

U.S. PATENT DOCUMENTS

| | | | |
|---|---|---|---|
| 6,717,926 B1 | 4/2004 | Deboille et al. | |
| 7,085,868 B2 | 8/2006 | Layman et al. | |
| 8,014,305 B1 | 9/2011 | Gilbert et al. | |
| 8,374,159 B2 | 2/2013 | Roberts et al. | |
| 2004/0156399 A1* | 8/2004 | Eran | 370/913 |
| 2006/0088020 A1* | 4/2006 | Gass | 370/338 |
| 2013/0295989 A1* | 11/2013 | Smadi et al. | 455/553.1 |
| 2014/0162675 A1* | 6/2014 | Rost et al. | 455/452.1 |

FOREIGN PATENT DOCUMENTS

JP 2010130134 A 6/2010

* cited by examiner

*Primary Examiner* — Ian N Moore
*Assistant Examiner* — Lakeram Jangbahadur
(74) *Attorney, Agent, or Firm* — DeLizio Law, PLLC

(57) ABSTRACT

Access to an access point is restricted to a plurality of client devices having wireless connections with the access point. The wireless connections conform to a wireless networking protocol. A first data transmission rate is the lowest data transmission rate defined by the wireless networking protocol. It is determined that a second data transmission rate is used between a first client device of the plurality of client devices and the access point. The second data transmission rate is the lowest data transmission rate used by the plurality of client devices. The second data transmission rate is greater than the first data transmission rate. Responsive to said determining that the second data transmission rate is the lowest data transmission rate used by the plurality of client devices, a beacon frame data transmission rate is set to the second data transmission rate.

39 Claims, 8 Drawing Sheets

BEACON FRAME DATA TRANSMISSION RATE ADJUSTMENT

BACKGROUND

Embodiments of the inventive subject matter generally relate to the field of networking, and, more particularly, to wireless access points.

Access points (hereinafter "APs") used to be specialized network devices that connect wireless devices (hereinafter "client devices") to a wired network. As technologies improve, AP functionality may be integrated into other devices. For example, a computer can act as an AP, sharing a wired or wireless network with a smart phone. Smart phones, similarly, can share Internet connectivity over a cellular network with a wireless-enabled computer, such as a laptop. APs are frequently referred to as "hotspots," and hotspots created using mobile devices may be referred to as "mobile hotspots."

As AP functionality migrated to less specialized and mobile devices, the general functionality was not changed to take into account potential problems. For example, devices designed specifically to function as APs are generally connected to a "permanent" power source, such as a local power grid (via a wall outlet, for example). Mobile devices, however, do not always have a permanent power source. For devices that rely, at least part of the time, on battery power, inclusion of AP functionality can increase power consumption, thereby undesirably decreasing battery life.

SUMMARY

Various embodiments for adjusting a beacon frame data transmission rate are disclosed. In one embodiment, access to an access point is restricted to a plurality of client devices having wireless connections with the access point. The wireless connections conform to a wireless networking protocol. A first data transmission rate is a lowest data transmission rate defined by the wireless networking protocol. It is determined, at the access point, that a second data transmission rate is used between a first client device of the plurality of client devices and the access point. The second data transmission rate is a lowest data transmission rate used by the plurality of client devices. The second data transmission rate is greater than the first data transmission rate. Responsive to said determining that the second data transmission rate is the lowest data transmission rate used by the plurality of client devices, a beacon frame data transmission rate is set at the access point to the second data transmission rate.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

Figure 1:
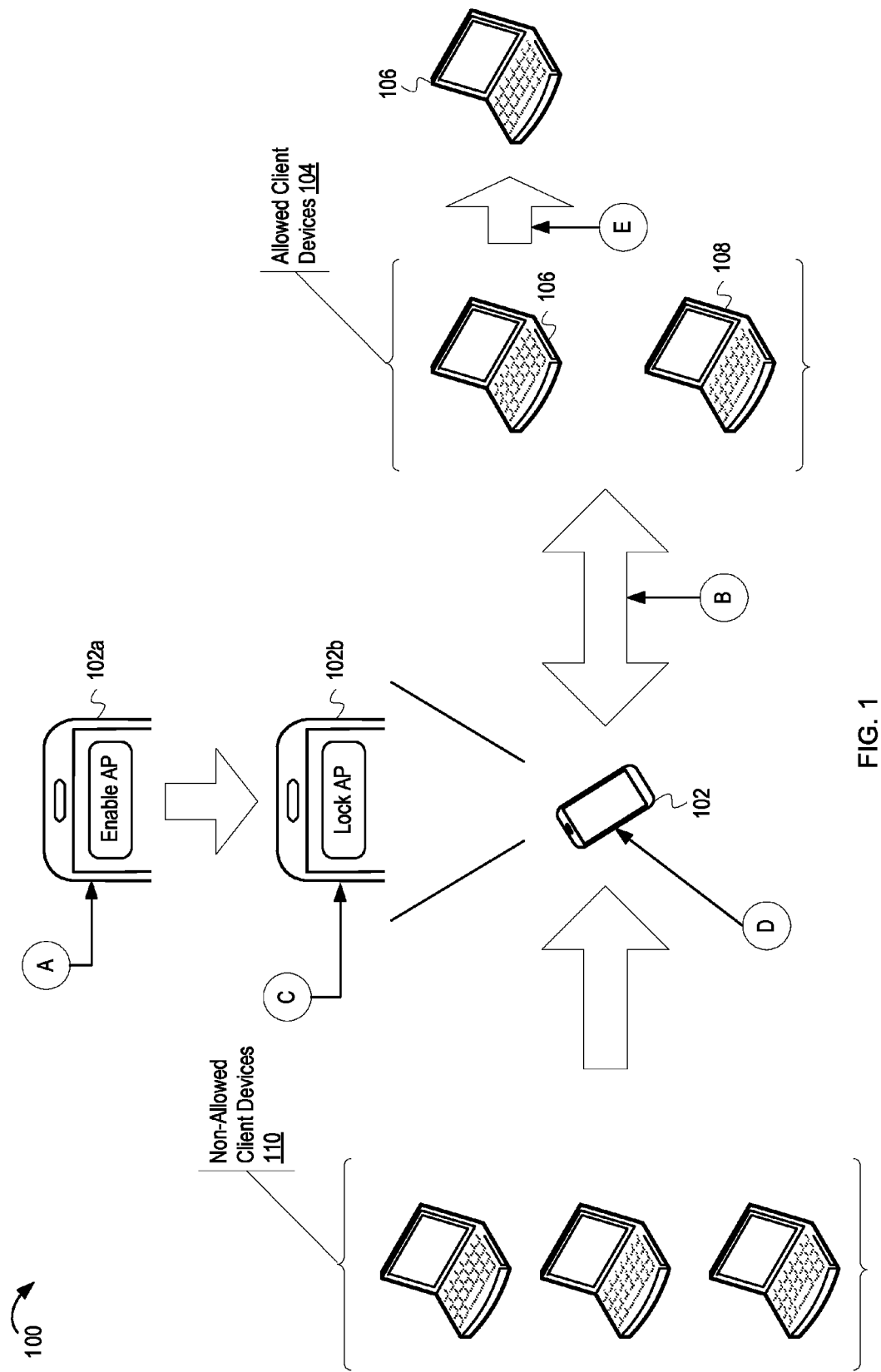
FIG. 1 is an example diagram that depicts the interactions of an AP device implementing AP locking functionality with other client devices.

The description that follows includes example systems, methods, techniques, instruction sequences and computer program products that embody techniques of the present inventive subject matter. However, it is understood that the described embodiments may be practiced without these specific details. For instance, although examples refer to the IEEE (Institute of Electrical and Electronics Engineers) 802.11 wireless networking standards, the inventive subject matter can also apply to other wireless networking standards or protocols that provide for multiple data rates. Further, although examples refer to data rates defined for the IEEE 802.11g wireless networking standards, the inventive subject matter is not limited to any particular set of data rates. In other instances, well-known instruction instances, protocols, structures and techniques have not been shown in detail in order not to obfuscate the description.

An AP device may implement one or more wireless networking protocols. Wireless networking protocols may support multiple data rates. For example, the IEEE 802.11g standard can support data rates from 6 megabits per seconds (Mb/s) to 54 Mb/s. AP devices and client devices can be designed to support a particular maximum data rate. However, various factors can cause the AP devices and client devices to function at a data rate lower than the maximum data rate. For example, distance between an AP device and a client device and interference from other devices or physical objects can result in lower data rate. Thus, each device connected to a wireless network can operate at a different data rate.

Wireless networking protocols can implement "beacon frames" or similar functionality. Beacon frames are messages sent from an AP device that can include information about the wireless network managed by the AP device. For example, in accordance with the IEEE 802.11 standards, a beacon frame typically includes information detailing the capabilities of the AP device/wireless network, supported data rates and the service set identifier (SSID), among other information. Thus, beacon frames can allow a client device to provide a user with a list of available wireless networks. Beacon frames can also include an indication of the "beacon interval," which allows client devices to determine when the next beacon frame will be transmitted.

Because a beacon frame provides basic information about a network, the beacon frame is generally transmitted at the lowest data rate that is compatible with the wireless networking protocol implemented by the AP device. For example, the beacon frame in accordance with the IEEE 802.11g standard might be transmitted at 6 Mb/s, even though a client device is connected to the AP device at 54 Mb/s. This can allow the beacon frame to be received and decoded by the broadest variety of client devices and provides the widest range (distance). Beacon frames can be transmitted at regular, frequent intervals, regardless of whether there is a known, compatible client device within range. For example, one common configuration for IEEE 802.11 standards is to transmit a beacon frame every 0.1024 seconds, or slightly less than ten beacon frames per second.

Transmitting at a data rate lower than the maximum data rate can cause more power consumption because the higher the data rate a beacon frame is transmitted, the less time it takes to transmit and receive. For example, a beacon frame transmitted at 6 Mb/s can take nine times as long to transmit as a beacon frame transmitted at 54 Mb/s. A client device can enter a power save mode when it is not receiving data and can remain in power save mode until the AP device is due to transmit another beacon frame. Thus, a client device that receives a beacon frame at 54 Mb/s can be in power save mode for approximately nine times as long as a client device that receives a beacon frame at 6 Mb/s.

An AP device can be implemented to reduce power consumption while maintaining compatibility with existing protocols. In some embodiments, AP functionality can be enabled on an AP device to allow a specific set of client devices to connect to the AP device. Once the desired client devices connect to the AP device, the AP device can be "locked," such that no additional client devices can connect to the AP device. By restricting the client devices to a specific set, the AP device can ignore requests transmitted by undesired client devices, thus reducing power consumption caused by responding to the ignored requests. As described above, the beacon frame is generally transmitted at the lowest data rate specified by the protocol. However, once access to the AP device is restricted to the specific set of client devices, the beacon rate can be increased from the lowest data rate specified by the protocol to the lowest data rate in use by the set of client devices.

FIG. 1 is an example diagram that depicts the interactions of an AP device implementing AP locking functionality with other client devices. FIG. 1 depicts a set of devices 100, including an AP device 102, a set of allowed client devices 104 and a set of non-allowed client devices 110. FIG. 1 also depicts two views of the AP device 102 screen 102a and 102b. The set of allowed client devices 104 includes two allowed client devices 106 and 108.

At stage A, AP functionality on the AP device 102 is enabled. In some implementations, the user of the AP device 102 can enable the AP functionality in a manner determined by the specific implementation of the AP device 102. For example, the user might enable the AP functionality by accessing an application installed on the AP device 102. The user might also enable the AP functionality by accessing the AP device 102 settings. The first AP device 102 screen 102a depicts an example embodiment in which a button labeled "Enable AP" is visible on the AP device's 102 screen. The AP device 102 user can press the "Enable AP" button to enable the AP functionality. Some embodiments of the AP device 102 include a physical button that allows the AP device 102 user to enable the AP functionality without accessing the AP device 102 software. In some implementations, the AP functionality of the AP device 102 can be enabled without user interaction. For example, when the AP device 102 connects to a second AP device, such as a predetermined AP device in the user's home, the AP device 102 can automatically enable the AP functionality. Similarly, the AP device 102 can detect the presence of a specific allowed client device, such as the client device 106, and enable the AP functionality in response to detecting the presence of the particular allowed client device. In general, the AP functionality can be enabled by a variety of triggers. For example, enabling AP functionality by user interaction with software and hardware-based buttons are described above. Other user interactions can enable AP functionality as well, such as various movement patterns on the AP device 102 screen, various combinations of button presses or multi-touch patterns, various physical movements of the AP device 102, etc. Similarly, various non-user actions can cause the AP functionality on the AP device 102 to be enabled, as described above.

The AP functionality embodied on the AP device 102 can include access control, authentication functionality, or other security features that restrict wireless access to the AP device 102 by the allowed client devices 104. For example, the AP functionality can include password protection functionality such that a client device transmits a password when attempting to connect to the AP device 102. The password may be entered on the client device by the client device user, and may be saved for future use. Some implementations can restrict access using cryptographic keys, access control lists, etc. By including functionality that allows a set of allowed client devices 104 to be defined, non-allowed client devices 110 cannot connect to the AP device 102 after the AP functionality is enabled.

At stage B, allowed client devices 104 wirelessly connect to the AP device 102. The AP device 102 and allowed client devices 104 implement at least one wireless communication protocol such as the IEEE 802.11 and the IEEE 802.16 family of protocols. Specific implementations of the techniques used to establish a connection between two devices are not discussed herein, but are generally part of the specification for the particular wireless networking protocols implemented.

At stage C, the AP lock functionality is enabled on the AP device 102, indicating that no additional client devices are permitted to connect to the AP device 102. Thus, for example, even if a client device has the proper credentials to connect to the AP device 102, as described at stage A, the client device will not be able to connect after the AP lock functionality is enabled. The AP device 102 user can cause the AP lock functionality to be enabled in various ways, depending on the particular implementation. For example, after the user enables the AP functionality as described at stage A, the AP device 102 can present the user with a button labeled "Lock AP", as depicted in the second AP device 102 screen 102b. The user can indicate that the AP lock functionality should be enabled by pressing the area of the screen indicated by the button. The user can interact with the AP device 102 to cause the AP device 102 to enable the AP lock functionality in a variety of ways, such as those described above for enabling the AP functionality. The AP device 102 can also enable the AP lock functionality on the AP device 102 without user interaction, as described in detail below.

When the AP device 102 receives an indication that the AP lock functionality should be enabled, the AP device 102 may determine which allowed client devices 104 are connected to the AP device 102. After determining which allowed client devices 104 are connected to the AP device 102, the AP device 102 can ignore communications from unconnected or non-allowed client devices 110. The AP device 102 can implement an access control list, such as a list restricting access based on MAC (media access control) addresses. The access control list can be static or can be dynamically generated. For example, the access control list can be pre-generated and stored in a memory. The access control list can also be dynamically generated in response to the AP device 102 user's indication that the AP lock functionality should be enabled. In other words, instead of the AP device 102 user entering in the individual MAC addresses corresponding to the allowed client devices 104, the AP device 102 can generate the list of MAC addresses dynamically, based on the currently connected clients.

At stage D, the AP device 102 determines the lowest data rate used by the allowed client devices 104. The AP device 102 can then begin transmitting beacon frames at the lowest data rate used by the allowed client devices 104. For example, assume that beacon frames are typically transmitted at 6 Mb/s, the first allowed client device 106 is connected to the AP device 102 using a 12 Mb/s data rate, and the second allowed client device 108 is connected to the AP device 102 using a 24 Mb/s data rate. The AP device 102 determines that 12 Mb/s is the lowest data rate used by the allowed client devices 104 and begins transmitting the beacon frame at 12 Mb/s instead of 6 Mb/s. The beacon frame is thus transmitted to both the first allowed client device 106 and the second allowed client device 108 at 12 Mb/s, even though the second allowed client device 108 is connected using a 24 Mb/s data rate.

The implementation of the AP device 102 can vary and the implementation of modifying the beacon frame data rate can vary accordingly. For example, the implementation of the operations described herein can be purely in hardware or a combination of software, hardware and/or firmware. Any software or firmware component can be partly or entirely stored and executed as an integral component of the hardware that transmits and receives the wireless signal (hereinafter "wireless hardware"). Any software or firmware component can be stored and executed by a general purpose processor that is not part of the wireless hardware.

Furthermore, at stage D, the AP device 102 may ignore requests from non-allowed client devices 110. For example, wireless devices can send probe request frames to other wireless devices. A probe request frame can indicate that the sending wireless device is attempting to determine what other wireless devices are within range. A probe response frame can be sent in response to a probe request frame, and may contain information similar to that of a beacon frame. There are other frame types that the AP device 102 might respond to, such as authentication frames, association frames, etc. Although the AP device 102 might not be able to avoid receiving and decoding frames sent from the non-allowed client devices 110, ignoring frames that the AP device 102 might otherwise respond to can reduce the amount of power used by the AP device 102. Similarly, once the AP device 102 determines that a particular frame is from a non-allowed client device, the AP device 102 can stop processing the frame further, thus further reducing the amount of power used.

At stage E, the first allowed client device 106 may move out of range of the AP device 102 or otherwise lose the connection with the AP device 102. When the AP device 102 determines that the connection with a previously connected allowed client device 106 was lost, the AP device 102 can be implemented to perform a variety of operations. In some implementations, the AP device 102 can maintain the AP locking functionality and begins transmitting the beacon frame at the minimum supported data rate. Thus, in the above example, the data rate used to transmit the beacon frame reverts back to 6 Mb/s. By reducing the data rate used to transmit the beacon frame, the AP device 102 increases the range and fault tolerance of the transmission, permitting the first allowed client device 106 to reconnect once contact is reestablished. Although potentially resulting in increased power usage of both the AP device 102 and the second allowed client device 108, the first allowed client device 106 has the greatest chance of reconnecting if the AP device 102 reduces the data rate used to transmit the beacon frame. To reduce the impact on power consumption caused by reducing the beacon frame data rate, the AP device 102 can incrementally decrease the beacon frame data rate. For example, if the protocol described in the above example also supports a 9 Mb/s data rate, the AP device 102 can decrease the beacon frame data rate to 9 Mb/s and then attempt to reestablish the connection with the client device 106. If the connection is not reestablished within a certain time interval, the AP device 102 then may decrease the beacon frame data rate further (e.g., to 6 Mb/s).

In some implementations, the AP device 102 can update the beacon frame data rate when a previously connected allowed client device loses connection based on the data rate of the currently connected allowed client devices. For example, if the connection with the first allowed client device 106 is lost, the AP device 102 can increase the beacon frame data rate to the data rate used by the second allowed client device 108, 24 Mb/s. The AP device 102 can remove the first allowed client device 106 from the list of allowed client devices 104, effectively locking the first allowed client device 106 from reconnecting to the AP device 102. In order for the first allowed client device 106 to reconnect, the AP lock functionality can be disabled by the user interacting with the AP device 102 or upon the AP device 102 receiving an indication that the first allowed client device 106 is attempting to reconnect. After the AP lock functionality on the AP device 102 is disabled and the first allowed client device 106 is allowed to reconnect, the AP lock functionality can be re-enabled. Alternatively, the AP device 102 can mark the first allowed client device 106 as being disconnected, but not remove the first allowed client device 106 from the list of allowed client devices 104. If the first allowed client device 106 then becomes capable of communicating with the AP device 102 at the higher data rate (e.g., by moving the first allowed client device 106 closer to the AP device 102), the AP device 102 would reestablish the connection with the first allowed client device 106.

The AP device 102 user can also be given the option of selecting from the above or other implementations. For example, when the AP device 102 determines that the connection with the first allowed client device 106 was lost, the AP device 102 can notify the user and present options to either lower the beacon frame data rate or remove the first allowed client device 106 from the allowed client devices 104 list. Providing the AP device 102 user multiple options allows the user to select the most appropriate strategy based on information available to the user. For example, if the connection with the first allowed client device 106 was lost because the first allowed client device 106 was removed from the area and would not be reconnecting, reestablishing the beacon frame data rate based on the second allowed client device 108 can be a more efficient strategy. If the connection with the first allowed client device 106 was lost for unknown reasons and the first allowed client device 106 should be allowed to reconnect, decreasing the beacon data frame rate might be the preferred strategy.

Figure 2:
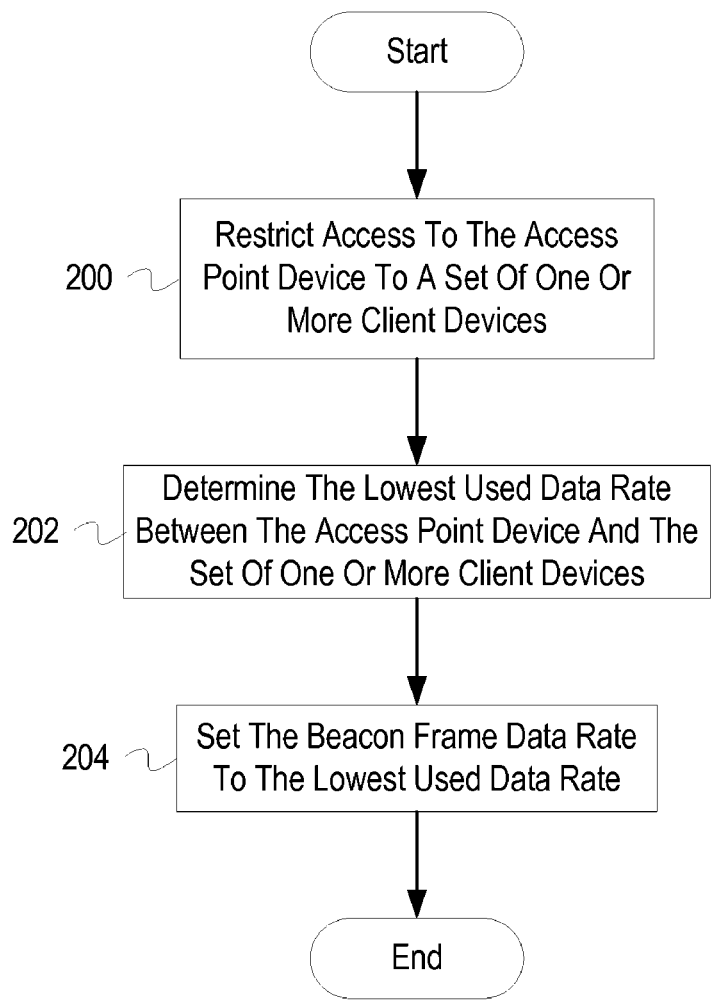
FIG. 2 depicts a flowchart of example operations for adjusting a beacon frame data rate based on a specific set of client devices.

FIG. 2 depicts a flowchart of example operations for adjusting a beacon frame data rate based on a specific set of client devices.

At block 200, access to an AP device is restricted to a set of one or more client devices. In some implementations, the set of one or more client devices can be based off of a static list of allowed client devices. For example, a user can create a list of client devices that are allowed to use the AP functionality. When a client device on the list attempts to use the AP functionality, the client device is allowed to connect. In some implementations, the set of one or more clients can be based off of a dynamic list of allowed client devices. For example, when the AP device receives an indication that access to the AP functionality should be restricted, the AP device dynamically generates a list of allowed client devices based on the client devices that are currently connected. Further, some implementations can combine both a static list of allowed client devices and a dynamic list of allowed client devices. Thus, the AP device can include a static list of allowed client devices, and further restrict access based on the set of allowed client devices that are currently connected. After the AP device restricts access to the AP functionality to the set of one or more client devices, control then flows to block 202.

At block 202, the AP device determines the lowest used data rate between the AP device and the set of one or more client devices. Each client device connected to the AP device can be communicating with the AP device at a different data rate than the others. Thus, the AP device iterates through the data rates used by the client devices and determines the lowest used data rate. Alternatively, the AP device can maintain a lowest used data rate variable, stored in a memory location, register, etc. In other words, when the data rate between the AP device and any of the client devices decreases, the AP device compares the new data rate with the currently stored lowest used data rate. If the new data rate is less than the currently stored lowest used data rate, the lowest used data rate is updated by storing the new data rate. When the data rate between the AP device and any of the client devices increases, the AP device determines if any of the client devices are still using the currently stored lowest used data rate. If no client device is still using the currently stored lowest used data rate, the currently stored lowest used data rate is updated to reflect the new lowest used data rate. After the AP device determines the lowest used data rate between the AP device and the set of one or more client devices, control then flows to block 204.

At block 204, the AP device sets the beacon frame data rate to the lowest used data rate. The AP device can set the beacon frame data rate to the lowest used data rate by indicating the lowest used data rate to the appropriate hardware. In some implementations, the AP device can write a value representing the lowest used data rate to a register or other memory location indicating the beacon frame data rate. In some implementations, the AP device generates the data that represents the beacon frame and includes the beacon frame data rate with the beacon frame data. For example, a first component within the AP device can generate the data that is to be sent as the beacon frame, including determining the SSID to be sent, the supported protocol features, etc. The first component can then send the beacon frame data, along with metadata indicating the data rate to use for sending the beacon frame, to a second component that does the actual wireless transmission of the beacon frame. For example, the first component can be a processor, while the second component can be a wireless networking device including a radio transceiver (e.g., as will be shown below in FIG. 8).

Figure 3:
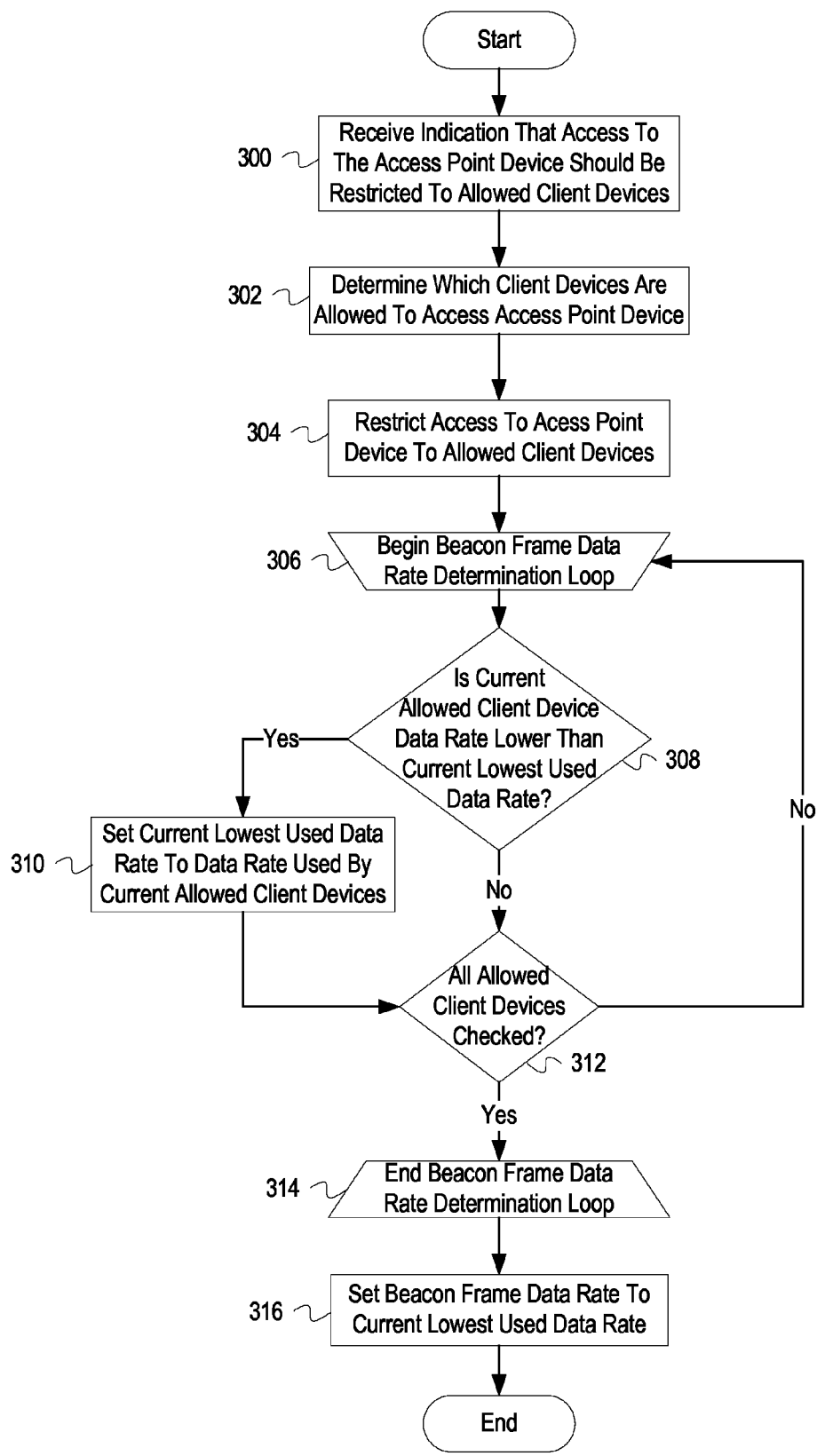
FIG. 3 depicts a flowchart of example operations for adjusting a beacon frame data rate based on a specific set of client devices in greater detail.

FIG. 3 depicts a flowchart of example operations for adjusting a beacon frame data rate based on a specific set of client devices in greater detail.

At block 300, an AP device receives an indication that access to the AP device should be restricted to a set of allowed client devices. In some implementations, the indication can be triggered by a user interacting with a user interface of the AP device, as described above. In some implementations, the indication can be triggered without user interaction. For example, if the set of allowed client devices is preconfigured, the AP device can determine when all allowed client devices are connected and generate the indication that access to the AP device should be restricted. In some implementations, the indication can be triggered by either user interaction with a user interface or without user interaction. For example, a set of allowed client devices can be preconfigured, and when all allowed client devices are connected to the AP device, the AP device hardware or software indicates that access to the AP functionality should be restricted, as just described. However, the user can also indicate that access to the AP functionality should be restricted when fewer than all of the preconfigured allowed client devices are connected. After the AP device receives the indication that access to the AP functionality should be restricted to the set of allowed client devices, control then flows to block 302.

At block 302, the AP device determines which client devices are allowed to access the AP device. The AP device determines which client devices are allowed to access the AP device based on which client devices are currently connected. In other words, an indication that access to the AP device should be restricted, as received at block 300, indicates, implicitly or explicitly, that the client devices connected when the indication is received are the allowed client devices. In some implementations, which client devices are allowed can be preconfigured. For example, a list of client device identifiers can be maintained that indicates which client devices are allowed client devices for the purposes of the AP lock functionality, a setting can indicate that the client devices connected to the AP device when a specified number of client devices are connected are allowed client devices, etc. After the AP device determines which client devices are allowed to access the AP functionality, control then flows to block 304.

At block 304, the AP device restricts access to the AP functionality to the allowed client devices determined at block 302. The AP device restricts access to the allowed client devices by denying connection attempts from other client devices. The AP device can also implicitly deny connection attempts from other client devices by ignoring the connection attempts, as discussed below. Although the specific implementation can vary, after restricting access, non-allowed client devices cannot use the AP functionality. After the AP device restricts access to the AP functionality, control then flows to block 306.

At block 306, the AP device begins a loop in which the beacon frame data rate is determined. The loop is initialized by setting one of the allowed client devices as the current allowed client device and setting the current lowest used data rate to a default value. The current lowest used data rate default value can either indicate that no lowest used data rate has been set, such as a null value, or can be the highest data rate available to the specific wireless networking protocol. Each additional pass through block 306 includes updating the current allowed client device to a different allowed client device that has not been the current allowed client device. After the loop is initialized or updated, control then flows to block 308.

At block 308, the AP device determines whether the data rate used for the wireless connection between the current allowed client device and the AP device is less than the value of the current lowest used data rate. If the current lowest used data rate is set to a value indicating that no lowest used data rate has been set, the AP device determines that the data rate used by the current allowed client device is less than the current lowest used data rate. If the current lowest used data rate has been set, the AP device compares the value of the data rate used by the current allowed client device with the current lowest used data rate. The AP device can determine the current allowed client device data rate by reading metadata related to the connection of the current allowed client device. The metadata can be stored in various places, such as the main memory of the AP device or in memory located within the hardware component implementing the wireless functionality. Further, the AP device can communicate with the current allowed client device to determine the current allowed client device data rate. For example, the AP device can request that the current allowed client device indicate the current used data rate or determine the used data rate based on a received message (e.g., a probe response message). If the data rate used by the current allowed client device is less than the current lowest used data rate, control then flows to block 310. If the data rate used by the current allowed client device is not less than the current lowest used data rate, control then flows to block 312.

At block 310, the AP device sets the current lowest used data rate to the data rate used by the current allowed client device. The current lowest used data rate can be stored as a variable in memory, such as the main memory coupled with a processor or a register on a processor. After the AP device sets the current lowest used data rate to the data rate used by the current allowed client device, control then flows to block 312.

Control flowed to block 312 if it was determined, at block 308, that the data rate used by the current allowed client device was not less than the current lowest used data rate. Control also flowed to block 312 from block 310. At block 312, the AP device determines whether all allowed client device data rates have been checked. If all allowed client device data rates have not been checked, control flows back to block 306. If all allowed client device data rates have been checked, control then flows to block 314.

At block 314, the loop in which the AP device determines the lowest data rate used by the allowed client devices is complete. At the end of the loop, the current lowest used data rate is set to the lowest data rate used by the set of allowed client devices. Control then flows to block 316.

At block 316, the AP device sets the beacon frame data rate to the current lowest used data rate. The specific implementation of how the beacon frame data rate is set can vary. For example, the AP device can set the beacon frame data rate by indicating a value corresponding to the current lowest used data rate to the software or hardware component responsible for sending the beacon frame, such as by including the value with the data that comprises the beacon frame. The AP device can also write the current lowest used data rate to a register located within the hardware responsible for sending the beacon frame. After setting the beacon frame data rate to the current lowest used data rate, the process ends.

In some implementations, such as described above, once the AP lock functionality is enabled, no other client device can use the AP functionality. However, in some implementations, additional client devices can connect. For example, assume two client devices are using the AP functionality of a locked AP device. A third client device has the proper credentials to use the AP functionality (such as the proper password). The AP device can be implemented such that if the third client device can communicate at the same data rate that the beacon frame is transmitted at, the third client device will be added to the list of allowed client devices once the AP credentials are verified. Similarly, the AP device can be implemented such that if the AP device receives a frame indicating a request to use the AP functionality, the AP device temporarily lowers the beacon frame data rate to the lowest data rate supported by the protocol. The AP device then allows a connection attempt from the requesting client device, and if successful, adds the requesting client device to the list of allowed client devices. Once the newly connected client device is added to the list of allowed client devices, the AP device then again adjusts the beacon frame data rate as described above.

Existing access control techniques can be utilized in conjunction with the capabilities described herein as described above. For example, a preconfigured list of devices can be used to determine whether a device is allowed to use the AP functionality prior to the AP locking functionality being enabled. Thus, the AP locking functionality restricts access to the AP device beyond additional access control techniques.

For the purpose of not obfuscating the examples above, the examples refer to a single wireless networking protocol when describing the AP device. However, AP devices can support multiple wireless networking protocols. For example, while an AP device might support the latest IEEE 802.11n standard, the AP device might also support legacy standards, such as IEEE 802.11b. In these scenarios, the functionality can be implemented to apply the beacon frame data rate adjustment on a per protocol basis. For example, assume a first client device is connected to an AP device using the IEEE 802.11b standard and two client devices are connected to the AP device using the IEEE 802.11n standard. When the AP locking functionality is enabled, the AP device can adjust the beacon frame data rate for the first client device to the data rate associated with the first client device's connection. The AP device can then adjust the beacon frame data rate for the other two client devices to the lowest used data rate for the two client devices connected using the IEEE 802.11n standard. In some scenarios, the wireless networking protocols can be compatible enough that they may be treated as a single wireless networking protocol for the purposes of the AP locking functionality. It should be noted that the examples that follow also refer to the use of a single wireless networking protocol. However, just as described above, the implementations and embodiments described can be modified to work with multiple wireless networking protocols.

The data rate used for a connection between an AP device and a client device may not be static. For example, the distance between the AP device and client device may increase, such as if a person using the client device moves to another room in a house. Thus, in order to accommodate the longer distance, the AP device and client device might begin to communicate at a lower data rate, thus increasing the reliability of the connection over the longer distance. Similarly, the distance between the AP device and client device may decrease, allowing the data rate between the AP device and client device to be increased. Other factors, such as interference, both by other wireless signals and physical objects, such as walls, may also impact the data rate used by the AP device and client device for communications.

The embodiments described in relation to FIG. 3 iterate over a list of the allowed client devices to determine the lowest used data rate. However, the implementations can vary. For example, the AP device can maintain a list of allowed client devices that is sorted by the data rate of the connection for each of the allowed client devices. Thus, for example, the AP device can sort the list such that the first allowed client device on the list is using the lowest data rate. Once initially sorted, if the data rate for an allowed client device changes, the list can be updated by moving the entry for the changed allowed client device to the proper location based on the new data rate. Thus, any time a data rate is updated, the AP device merely examines the entry for the first allowed client device in the list.

Figure 4:
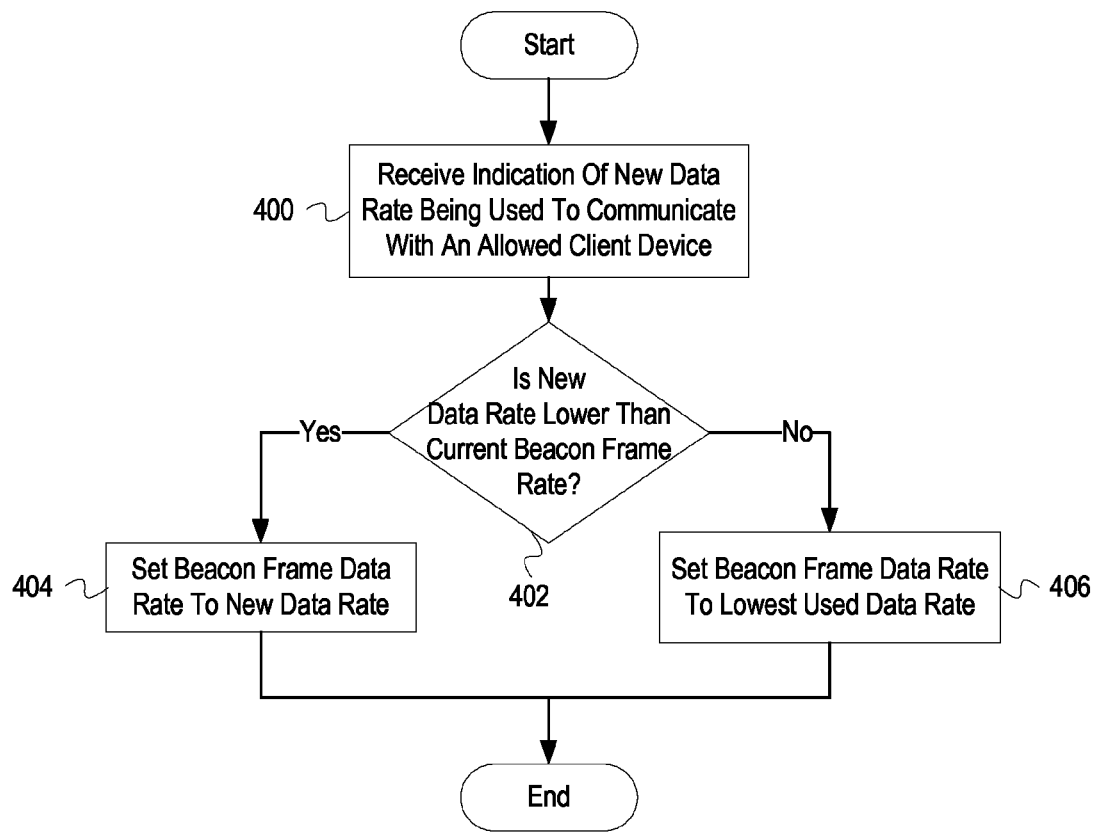
FIG. 4 depicts a flowchart of example operations for adjusting a beacon frame data rate after the AP lock functionality has been enabled.

FIG. 4 depicts a flowchart of example operations for adjusting a beacon frame data rate after the AP lock functionality has been enabled.

At block 400, an AP device receives an indication of a new data rate being used to communicate with an allowed client device. For example, as described above, the distance between the AP device and allowed client device may have increased or decreased, signal interference may have increased or decreased, etc. The indication can be sent by an AP device component that is responsible for adjusting the data rate. For example, the hardware component that implements the wireless functionality can also include software, hardware, or a combination thereof to dynamically adjust the data rates used between the AP device and connected client devices. After adjusting the data rate, the component can send the indication to the AP device component that implements the AP lock functionality. A single component can also be designed to implement both functionalities. The indication can include the new data rate or, in response to receiving the indication, the AP device can request and/or read data indicating the new data rate. After the AP device receives the indication that the new data rate is being used to communicate with the allowed client device, control then flows to block 402.

At block 402, the AP device determines if the new data rate is lower than the current beacon frame data rate. The AP device determines if the new data rate is lower than the current beacon frame data rate by comparing the current beacon frame data rate with the new data rate. If the AP device determines that the new data rate is lower than the current beacon frame data rate, control then flows to block 404. If the AP device determines that the new data rate is not lower than the current beacon frame data rate, control then flows to block 406.

At block 404, the AP device sets the beacon frame data rate to the new data rate. The AP device can set the beacon frame data rate to the new data rate in a manner substantially similar to that as described in block 316 of FIG. 3. By updating the beacon frame data rate in response to a new lowest used data rate, the AP device is able to maintain a compatible connection with all allowed client devices (unless the connection is lost for other reasons). After the AP device sets the beacon frame data rate to the new data rate, the process ends.

Control flowed to block 406 if the AP device determined, at block 402, that the new data rate was not lower than the current beacon frame data rate. At block 406, the AP device sets the current beacon frame data rate to the minimum data rate used by the allowed client devices. The AP device can set the current beacon frame data rate to the minimum data rate used by the allowed client devices in a manner substantially similar to that as described in blocks 306 through 316 of FIG. 3. Several scenarios can occur when the data rate for an allowed client device increases. In some scenarios, multiple allowed client devices initially communicate with the AP device using the minimum data rate. The data rate of one of the allowed client devices then increases from the lowest used data rate. However, the lowest used data rate does not change because at least one allowed client device is still using the lowest used data rate. In scenarios where an allowed client device using a data rate that is higher than the lowest used data rate has its data rate increased, the lowest used data rate remains unchanged as well. However, if all allowed client devices using the minimum data rate increase their data rate, then the AP device can update the lowest used data rate accordingly. By dynamically increasing the beacon frame data rate when the minimum used data rate increases, the AP device optimizes the power savings based on the changed conditions while maintaining allowed client device compatibility. After the AP device sets the current beacon frame data rate to the minimum data rate used by the allowed client devices, the process ends.

Figure 5:
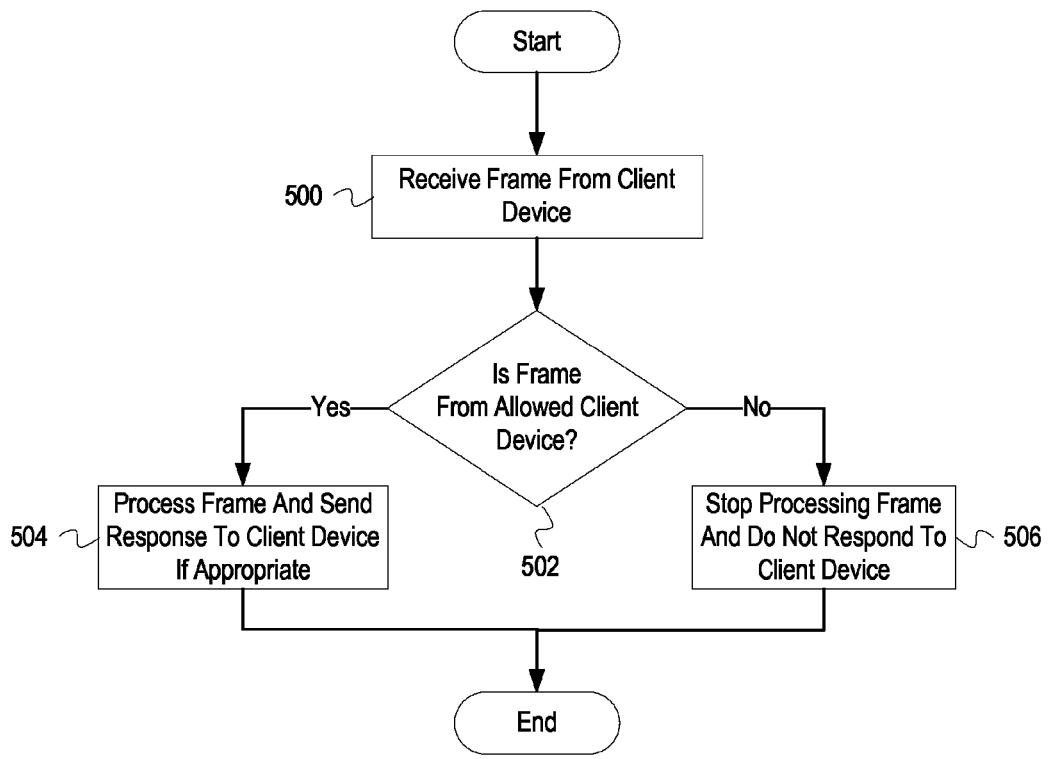
FIG. 5 depicts a flowchart of example operations for determining whether an AP device should respond to or ignore a received frame after the AP lock functionality has been enabled.

FIG. 5 depicts a flowchart of example operations for determining whether an AP device should respond to or ignore a received frame after the AP lock functionality has been enabled.

At block 500, the AP device receives a frame from a client device. The frame can be any type of frame that is compatible with the wireless functionality of the AP device. Further, the frame can be a broadcast frame in which the destination devices are all devices within range of the client device, a frame that is intended to be sent specifically to the AP device, or a frame that is intended to be sent specifically to another device. After the AP device receives the frame from the client device, control then flows to block 502.

At block 502, the AP device determines whether the frame is from an allowed client device. To determine whether the frame is from an allowed client device, the AP device can compare a source device identifier included in the frame with the list of allowed client devices. The source device identifier can specify the sending device using a unique identifier, such as an IP (Internet Protocol) address or MAC address. The source device identifier can be compatible with the device identifier used for the list of allowed client devices. Thus, after determining the source device identifier, the AP device can compare the source device identifier or derivative thereof with the device identifiers of the allowed client devices. The specific implementation of the frame and source device identifier can vary between different protocols and implementations, but will generally be defined as part of the network protocol. If the AP device determines that the source device identifier matches a device identifier in the list of allowed client devices, control then flows to block 504. If the AP device determines that the source device identifier does not match a device identifier in the list of allowed client devices, control then flows to block 506.

At block 504, the AP device processes the frame accordingly and responds to the client device if appropriate. Because the source device identifier of the frame received at block 500 matches a device identifier in the list of allowed client devices, the client device is an allowed client device, and thus the AP device can communicate with the client device. After the AP device processes the frame and responds to the client device (if appropriate), the process ends.

Control flowed to block 506 if the AP device determined, at block 502, that the frame is not from an allowed client device. At block 506, the AP device stops processing the frame and does not respond to the client device. Thus, upon determining that the client device is not an allowed client device, the AP device may refrain from further processing of the frame. By not further processing the frame, the AP device only uses enough power to determine that the frame should be ignored. After the AP device stops processing the frame, the process ends.

It should be noted that the AP device can include an AP implementation that verifies that a received frame is intended for the AP device after receiving the frame. In such a case, these frames might be discarded prior to being passed to the component(s) that implement(s) any of the functionality described above in relation to FIG. 5. There may be other reasons that the processing of the frame is stopped before determining whether the client device is an allowed client device.

Figure 6:
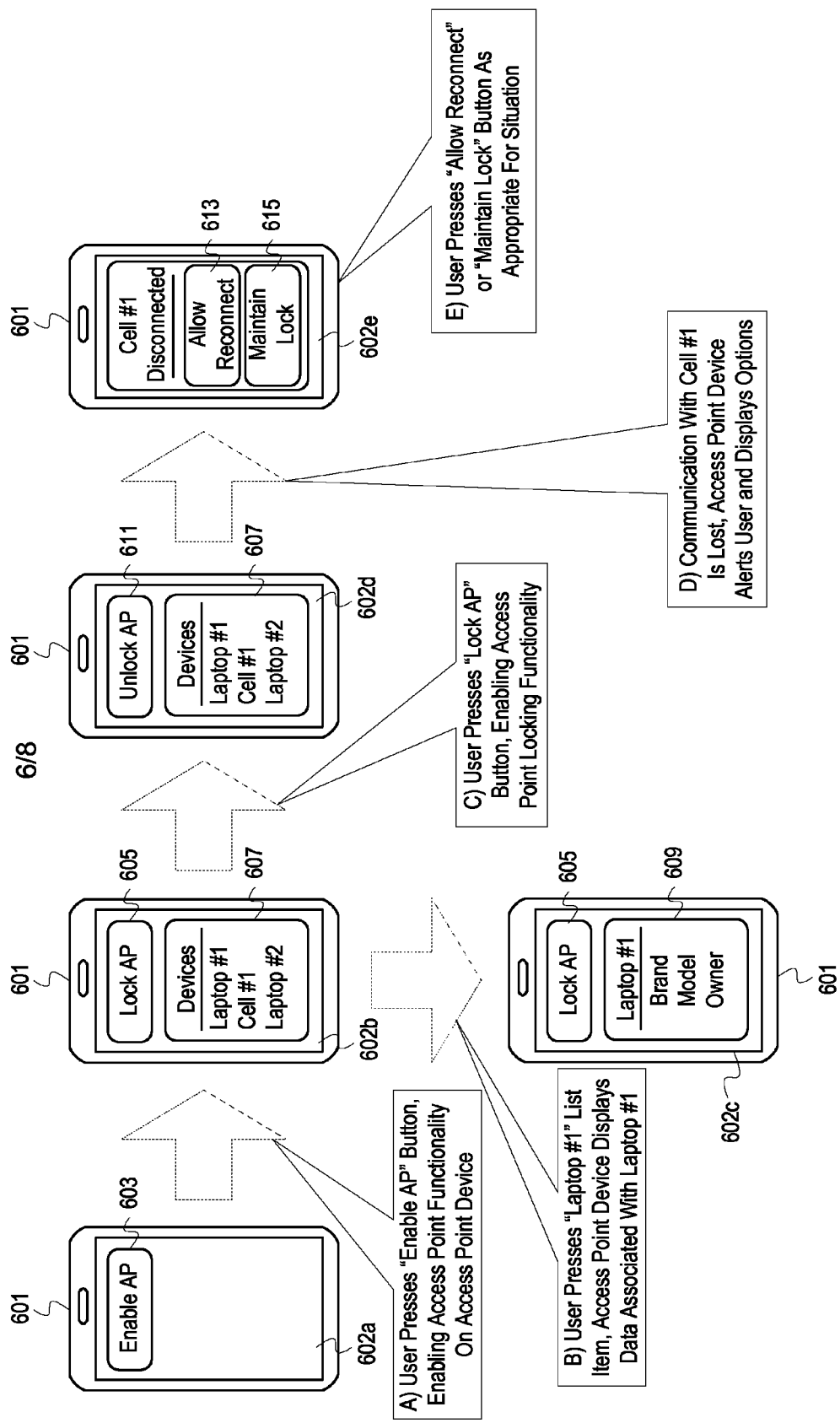
FIG. 6 depicts example user interfaces as embodied on a portable touchscreen device that implements AP locking functionality, such as a smartphone.

FIG. 6 depicts example user interfaces as embodied on a portable touchscreen device that implements AP locking functionality, such as a smartphone. FIG. 6 depicts an AP device 601, including an example set of touchscreen-based user interfaces 602a, 602b, 602c, 602d, and 602e. The AP device 601 embodies AP locking functionality as described herein. The AP device 601 also includes a touchscreen, allowing a user to interact with the AP device 601 by touching the screen. Further, the first user interface 602a includes an "Enable AP" button 603.

The operations allowing the user to reach the first user interface 602a can vary depending on the specific implementation, as described above. In some implementations, the user can reach the first user interface 602a by navigating to the AP device's 601 settings. In some implementations, the user can reach the first user interface 602a by navigating to and opening an application installed on the AP device 601. The AP device 601 can also include hardware mechanisms, such as physical buttons, that the user can interact with to bring up the first user interface 602a. Various other operations, whether software, hardware, or a combination thereof can bring the user to the first user interface 602a.

At stage A, the user presses the "Enable AP" button 603 by touching the portion of the first user interface 602a that corresponds with the "Enable AP" button 603. Upon pressing the "Enable AP" button 603, various software and hardware components within the AP device 601 can interact to enable the AP functionality as described above. The specific mechanisms involved in enabling the AP functionality can vary between implementations.

After the AP functionality is enabled, the AP device 601 can display the second user interface 602b. The second user interface 602b includes a "Lock AP" button 605 and a list of connected client devices 607. The list of connected client devices 607 displays a human-readable indication of which client devices have connected to the AP device 601 via the AP functionality. If a new client device connects, the list of connected client devices 607 can be updated to display the new client device. If a connected client device disconnects, the list of connected client devices 607 can be updated to remove the disconnected client device from the list of connected client devices 607. The indications of the connected client devices displayed can vary between implementations. For example, the list of connected client devices 607 might display a name associated with each connected client device, what type of device each connected client device is, etc. The main purpose of the list of connected client devices 607 is to allow the user to identify the connected client devices. Thus, the specific label for each item in the list of connected client devices 607 can vary depending on the data available to the AP device 601. Each item in the list of connected client devices 607 can also be selectable, e.g., by touching the portion of the screen corresponding to the individual item.

At stage B, the user presses the portion of the screen corresponding to the "Laptop #1" item. In response, the AP device 601 displays the third user interface 602c. The third user interface 602c can include additional data 609 about the connected client device associated with the "Laptop #1" item. The additional data 609 can include various data about specific item, such as brand, model, owner, etc. The additional data 609 can be selected to help the user identify the specific connected client device. The user can return to the second user interface 602b by pressing on the portion of the screen corresponding with the list of connected client devices 609, pressing on a user interface element indicating that the list of connected client devices 609 should be "hidden" or "closed," etc. Further, in some implementations, the "Lock AP" button 605 can still be displayed, allowing the user to continue directly to the fourth user interface 602d, as described below.

At stage C, the user presses the portion of the screen corresponding to the "Lock AP" button 605. In response, the AP device 601 enables the AP locking functionality as described above. Various software and hardware components can interact to enable the AP locking functionality depending on the particular implementation, such as the operations described above. After enabling the AP locking functionality, the AP device 601 displays the fourth user interface 602d. The fourth user interface 602d can include an "Unlock AP" button 611 and the list of connected client devices 607.

If the user presses the portion of the screen corresponding to the "Unlock AP" button 611, the AP locking functionality can be disabled, allowing additional client devices to connect to the AP device 601. An additional user interface, not depicted, can be displayed after disabling the AP locking functionality, allowing the user to disable the AP functionality entirely or enable the AP locking functionality again.

At stage D, communication with a connected client device, such as "Cell #1," is lost. In response, the AP device 601 can alert the user by displaying the fifth user interface 602e. The AP device 601 can also alert the user using other techniques, such as audible or tactile alerts. The fifth user interface 602e can include an indication that the specific client device disconnected, or that the AP device 601 otherwise could not communicate with the previously connected client device. Additionally, the fifth user interface 602e can display the options available to the user. For example, the AP device 601 can display an "Allow Reconnect" button 613 and a "Maintain Lock" button 615. If the user presses on the portion of the screen corresponding to the "Allow Reconnect" button 613, the AP device 601 can decrease the beacon frame data rate to the minimum data rate defined by the specific wireless networking protocol and can allow the disconnected client device to reconnect if communication can be reestablished. If the user presses on the portion of the screen corresponding to the "Maintain Lock" button 615, the AP device 601 can block the disconnected client device from reconnecting and can adjust the beacon frame data rate accordingly. The functionality associated with the "Allow Reconnect" button 613 and the "Maintain Lock" button 615 can be similar to the functionality described above at stage E of FIG. 1.

The user interfaces described above in relation to FIG. 6 are example user interfaces, and the flow between the user interfaces can vary between implementations and/or individual uses. For example, any of the user interfaces can also include a "Disable AP" button. In some implementations, the user can navigate away from any of the user interfaces and navigate back to the user interface that was navigated away from. For example, the user can perform other, unrelated operations on the AP device 601, such as using a web browser, checking e-mail, playing a game, etc. After performing other operations, the user can then navigate back to the appropriate AP user interface. Furthermore, the user interfaces can vary depending on the specific AP device 601. For example, the user interfaces can be adapted to various screen sizes, non-touch screen devices, etc.

Figure 7:
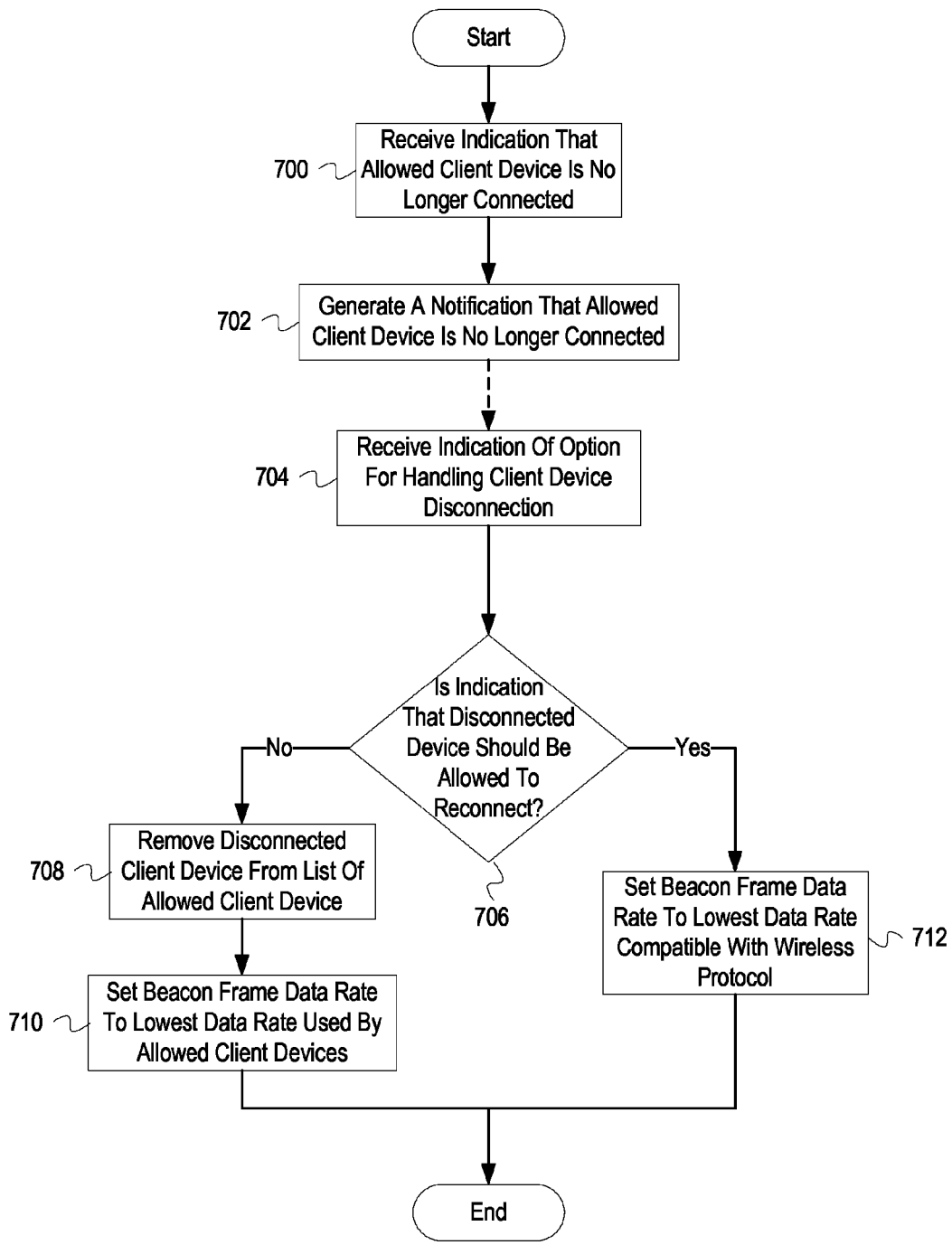
FIG. 7 depicts a flowchart of example operations for handling a lost connection between an allowed client device and an AP device based on user input.

FIG. 7 depicts a flowchart of example operations for handling a lost connection between an allowed client device and an AP device based on user input. In this particular example embodiment, the AP device can permit a user to select one of two options for handling a lost connection. The two options may be the same as described above: removing the disconnected client device from the allowed client device list and setting the beacon frame data rate to the lowest data rate allowed by the protocol without removing the disconnected client device from the allowed client device list. While this particular example embodiment describes handling a lost connection between an allowed client device and an AP device based on user input, some implementations can handle a lost connection between an allowed client device and an AP device without user input.

At block 700, the AP device receives an indication that the connection with an allowed client device was lost. For example, the component of the AP device that implements the wireless networking can keep track of the number of dropped frames by tracking the number of response (or lack thereof) from the allowed client device. If the number of dropped frames increases above a certain number, or frames are dropped at a rate above a certain threshold, the AP device can determine that the connection has been lost. Thus, the AP device can determine that the connection with the allowed client device is lost if the reliability of the connection drops below a certain point, as well as if no communication with the allowed client device is possible. The AP device can also determine that the connection is lost by an explicit or implicit indication from the allowed client device that the allowed client device is disconnecting. For example, during the process of shutting down, such as when turned off, the allowed client device can send a frame explicitly disconnecting from the AP device. Various other scenarios in which the AP device can determine that the connection with the allowed client device has been lost exist, and can vary between implementations. After the AP device receives an indication that the connection with allowed client device was lost, control then flows to block 702.

At block 702, the AP device generates a notification that the allowed client device is no longer connected. The AP device can indicate that the specific allowed client device is no longer connected or more generally, that one of the allowed client devices is no longer connected. The AP device can generate the notification using various techniques, individually or in combination, that can vary between implementations. For example, the AP device can display a message via a graphical user interface, provide an audible alert or speak a message, provide tactile feedback such as causing the AP device to vibrate, send a message via e-mail or text message, etc. The AP device can also generate a notification indicating a set of options, where the set of options may be dependent on the implementation. For example, the AP device can be implemented such that it always treats lost connections between the AP device and allowed client devices similarly, or it can be implemented with various options for handling lost connections with allowed client devices. In some implementations with multiple options for handling lost connections with allowed client devices, the specific option used can be configured as a setting, or as described in the current embodiment, options can be presented in a user-selectable form, allowing a user to select the appropriate option. In the current example embodiment, two options are provided, as described above. After the AP device notifies the user that the allowed client device is no longer connected, control then flows to block 704.

At block 704, the AP device receives an indication of one of the available options for handling a lost connection with an allowed client device. An indication can be generated in various ways depending on the implementation. For example, the AP device can display a message on a touchscreen indicating that the connection was lost along with buttons for each available option. A user can then press on the appropriate button. The AP device can also implement hardware buttons, voice commands, gestures, etc. or combinations thereof as ways for the user to indicate his/her selection. Another component of the AP device can also generate the indication. After the AP device receives an indication of one of the available options for handling a lost connection with an allowed client device, control then flows to block 706.

At block 706, the AP device determines which of the options is indicated. The indication received by the AP device at block 704 can include an identifier specifying which option was selected. If the option to not allow the disconnected client device to reconnect is indicated, control then flows to block 708. If the option to allow the disconnected client device to reconnect is indicated, control then flows to block 710.

At block 708, the AP device removes the disconnected allowed client device from the list of allowed client devices. Thus, the disconnected allowed client device becomes a non-allowed client device. As such, the AP device can treat it as a non-allowed client device, potentially ignoring any frames received from the now non-allowed client device and not permitting it to establish a new connection. After the AP device removes the disconnected allowed client device from the list of allowed client devices, control then flows to block 710.

At block 710, the AP device sets the current beacon frame data rate to the lowest data rate used by the allowed client devices. The AP device can set the current beacon frame data rate to the minimum data rate used by the client devices in a manner substantially similar to that as described in blocks 306 through 316 of FIG. 3. Also, scenarios similar to those described above in relation to block 406 of FIG. 4 when a data rate increases may arise. Thus, the lost connection may permit the AP device to increase the current beacon frame data rate, permitting even greater efficiency. After the AP device sets the current beacon frame data rate to the lowest date rate used by the allowed client devices, the process ends.

Control flowed to block 712 if the AP device determined, at block 706, that the user indicated that the disconnected client device should be allowed to reconnect. At block 712, the AP device sets the beacon frame data rate to the lowest data rate compatible with the wireless networking protocol. In other words, the beacon frame data rate is not set to the lowest data rate actually used by the allowed client devices, but rather the beacon frame data rate is set to the lowest data rate supported by the wireless networking protocol. By setting the beacon frame data rate to the lowest data rate supported by the wireless networking protocol, the AP device maximizes the range and reliability of the beacon frame, thus increasing the chance that the disconnected client device may receive a beacon frame and thus reconnect. After the AP device sets the beacon frame data rate to the lowest data rate compatible with the wireless networking protocol, the process ends.

As example flowcharts, the flowcharts depicted above present operations in an example order from which embodiments can deviate (e.g., operations can be performed in a different order than illustrated and/or in parallel). For example, determining which client devices are allowed to access the AP functionality as described in block 302 of FIG. 3 can occur before block 300 of FIG. 3.

Embodiments may take the form of an entirely hardware embodiment, a software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product embodied in any tangible medium of expression having computer usable program code embodied in the medium. The described embodiments may be provided as a computer program product, or software, that may include a machine-readable storage medium having stored thereon instructions, which may be used to program a computer system (or other electronic device(s)) to perform a process according to embodiments, whether presently described or not, since every conceivable variation is not enumerated herein. A machine readable storage medium includes any mechanism for storing information in a form (e.g., software, processing application) readable by a machine (e.g., a computer). The machine-readable storage medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions. A machine-readable storage medium does not encompass signals. Embodiments, however, may be embodied in a machine-readable signal medium. Examples of a machine-readable signal medium include an electrical, optical, acoustical or other form of propagated signal (e.g., carrier waves, infrared signals, digital signals, etc.), or wireline, wireless, or other communications medium.

Computer program code for carrying out operations of the embodiments may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer (for example, through the Internet using an Internet Service Provider).

Figure 8:
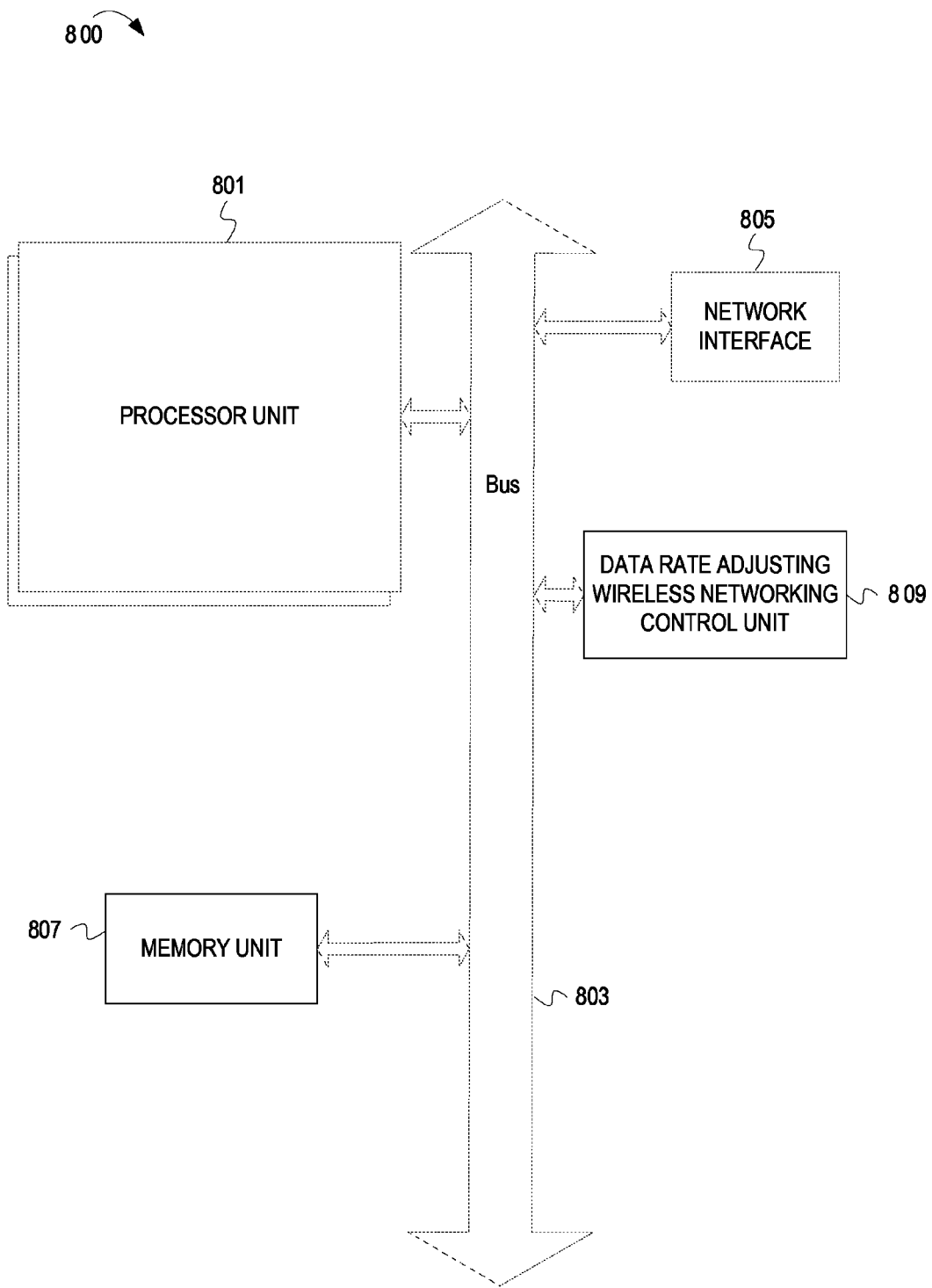
FIG. 8 depicts an example device including a data rate adjusting wireless networking control unit.

FIG. 8 depicts an example device including a data rate adjusting wireless networking control unit. A device 800 includes a processor unit 801 (possibly including multiple processors, multiple cores, multiple nodes, and/or implementing multi-threading, etc.). The device 800 includes memory 807. The memory 807 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable storage media. The device 800 also includes a bus 803 (e.g., PCI, ISA, PCI-Express, HyperTransport®, InfiniBand®, NuBus, etc.), a network interface 805 (e.g., an ATM interface, an Ethernet interface, a Frame Relay interface, SONET interface, wireless interface, etc.), and a data rate adjusting wireless networking control unit (hereinafter referred to as "wireless networking control unit") 809. The wireless networking control unit 809 embodies functionality to implement embodiments described above. The wireless networking control unit 809 may include one or more functionalities that facilitate adjusting the beacon frame data rate to increase the efficiency of the computer system. Although not depicted, the wireless networking control unit 809 and/or the network interface 805 can include an additional processor (such as a baseband processor), a radio transceiver, an antenna, etc. that implements the functionality. Any one of these functionalities may be partially (or entirely) implemented in hardware and/or on the processing unit 801. For example, the functionality may be implemented with an application specific integrated circuit, in logic implemented in the processing unit 801, in a co-processor on a peripheral device or card, etc. Further, the functionality can be implemented using any combination of the wireless networking control unit 809, the processor unit 801, networking interface 805, and other components of the device 800. Further, realizations may include fewer or additional components not illustrated in FIG. 8 (e.g., video cards, audio cards, additional network interfaces, peripheral devices, etc.). The processor unit 801 and the network interface 805 are coupled to the bus 803. Although illustrated as being coupled to the bus 803, the memory 807 may be coupled to the processor unit 801.

While the embodiments are described with reference to various implementations and exploitations, it will be understood that these embodiments are illustrative and that the scope of the inventive subject matter is not limited to them. In general, techniques for implementing APs as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the example configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising: A method comprising:
   receiving an indication to restrict access to an access point to a plurality of client devices, wherein the plurality of client devices have wireless connections with the access point, wherein the wireless connections conform to a wireless networking protocol, wherein a first transmission rate is a lowest transmission rate defined by the wireless networking protocol;
   responsive to said receiving the indication to restrict access to the access point to the plurality of client devices,
      determining client devices that comprise the plurality of client devices; and
      restricting access to the access point to the plurality of client devices;
   determining, at the access point, that a second data transmission rate is used between a first client device of the plurality of client devices and the access point, wherein the second data transmission rate is a lowest data transmission rate used by the plurality of client devices, wherein the second data transmission rate is greater than the first data transmission rate; and
   responsive to said determining that the second data transmission rate is the lowest data transmission rate used by the plurality of client devices, setting, at the access point, a beacon frame data transmission rate to the second data transmission rate,
   wherein said determining the client devices that comprise the plurality of client devices comprises determining a plurality of connected client devices, wherein a connected client device is a client device having a wireless connection with the access point, wherein the plurality of connected client devices comprises the plurality of client devices.

2. The method of claim 1 further comprising transmitting a beacon frame at the second data transmission rate.

3. The method of claim 1 further comprising ignoring a frame from a client device that is not a client device of the plurality of client devices.

4. The method of claim 1 further comprising determining that one client device of the plurality of client devices is no longer connected.

5. The method of claim 4 further comprising setting the beacon frame data transmission rate to the first data transmission rate responsive to said determining that one client device of the plurality of client devices is no longer connected.

6. The method of claim 5 further comprising:
receiving an indication that an option of a plurality of options was selected, wherein each option of the plurality of options corresponds to an action for reconfiguring the access point in response to determining one client device of the plurality of client devices is no longer connected;
wherein said setting the beacon frame data transmission rate to the first data transmission rate is responsive to said receiving the indication that the option of the plurality of options was selected.

7. The method of claim 4 further comprising setting the beacon frame data transmission rate to a third data transmission rate responsive to said determining that one client device of the plurality of client devices is no longer connected, wherein the third data transmission rate is greater than the second data transmission rate.

8. The method of claim 7 further comprising:
receiving an indication that an option of a plurality of options was selected, wherein each option of the plurality of options corresponds to an action for reconfiguring the access point in response to determining one client device of the plurality of client devices is no longer connected;
wherein said setting the beacon frame data transmission rate to the third data transmission rate is responsive to said receiving the indication that the option of the plurality of options was selected.

9. The method of claim 4 further comprising generating a notification that one client device of the plurality of client devices is no longer connected.

10. The method of claim 1 further comprising receiving an indication that a data transmission rate between one of the plurality of client devices and the access point has changed to a third data transmission rate, wherein the third data transmission rate is one of a plurality of data transmission rates defined by the wireless networking protocol.

11. The method of claim 10 further comprising:
determining that the third data transmission rate is less than the second data transmission rate; and
responsive to said determining that the third data transmission rate is less than the second data transmission rate, setting the beacon frame data transmission rate to the third data transmission rate.

12. The method of claim 10 further comprising:
determining that the third data transmission rate is greater than the second data transmission rate;
determining that a fourth data transmission rate is the lowest data transmission rate used by the plurality of client devices, wherein the fourth data transmission rate is greater than the second data transmission rate; and
responsive to said determining that the third data transmission rate is greater than the second data transmission rate and said determining that the fourth data transmission rate is the lowest data transmission rate used by the plurality of client devices, setting the beacon frame data transmission rate to the fourth data transmission rate.

13. The method of claim 1, wherein the wireless networking protocol defines a third data transmission rate, wherein the third data transmission rate is greater than the second data transmission rate, wherein at least one client device of the plurality of client devices communicates with the access point at the third data transmission rate.

14. A device comprising:
a processor; and
a wireless networking control unit coupled with the processor, the wireless networking control unit configured to:
receive an indication to restrict access to an access point to a plurality of client devices, wherein the plurality of client devices have wireless connections with the access point, wherein the wireless connections conform to a wireless networking protocol, wherein a first transmission rate is a lowest transmission rate defined by the wireless networking protocol;
responsive to said reception of the indication to restrict access to the access point to the plurality of client devices,
determine client devices that comprise the plurality of client devices; and
restrict access to the access point to the plurality of client devices;
determine, at the access point, that a second data transmission rate is used between a first client device of the plurality of client devices and the access point, wherein the second data transmission rate is a lowest data transmission rate used by the plurality of client devices, wherein the second data transmission rate is greater than the first data transmission rate; and
responsive to a determination that the second data transmission rate is the lowest data transmission rate used by the plurality of client devices, set, at the access point, a beacon frame data transmission rate to the second data transmission rate;
wherein the wireless networking control unit being configured to determine the client devices that comprise the plurality of client devices is configured to determine a plurality of connected client devices, wherein a connected client device is a client device having a wireless connection with the access point, wherein the plurality of connected client devices comprises the plurality of client devices.

15. The device of claim 14, further comprising:
a wireless network interface coupled with the wireless networking control unit, the wireless network interface configured to transmit a beacon frame at the second data transmission rate.

16. The device of claim 14, wherein the wireless networking control unit is further configured to ignore a frame from a client device that is not a client device of the plurality of client devices.

17. The device of claim 14, wherein the wireless networking control unit is further configured to determine that one client device of the plurality of client devices is no longer connected.

18. The device of claim 17, wherein the wireless networking control unit is further configured to set the beacon frame data transmission rate to the first data transmission rate responsive to said determining that one client device of the plurality of client devices is no longer connected.

19. The device of claim 18, wherein the wireless networking control unit is further configured to:

receive an indication that an option of a plurality of options was selected, wherein each option of the plurality of options corresponds to an action for reconfiguring the access point in response to determining one client device of the plurality of client devices is no longer connected;

wherein the wireless networking control unit is configured to set the beacon frame data transmission rate to the first data transmission rate in response to said reception of the indication that the option of the plurality of options was selected.

20. The device of claim 17, wherein the wireless networking control unit is further configured to set the beacon frame data transmission rate to a third data transmission rate in response to said determination that one client device of the plurality of client devices is no longer connected, wherein the third data transmission rate is greater than the second data transmission rate.

21. The device of claim 20, wherein the wireless networking control unit is further configured to:

receive an indication that an option of a plurality of options was selected, wherein each option of the plurality of options corresponds to an action for reconfiguring the access point in response to determining one client device of the plurality of client devices is no longer connected;

wherein the wireless networking control unit is configured to set the beacon frame data transmission rate to the third data transmission rate in response to said reception of the indication that the option of the plurality of options was selected.

22. The device of claim 17, wherein the wireless networking control unit is further configured to generate a notification that one client device of the plurality of client devices is no longer connected.

23. The device of claim 14, wherein the wireless networking control unit is further configured to receive an indication that a data transmission rate between one of the plurality of client devices and the access point has changed to a third data transmission rate, wherein the third data transmission rate is one of a plurality of data transmission rates defined by the wireless networking protocol.

24. The device of claim 23, wherein the wireless networking control unit is further configured to:

determine that the third data transmission rate is less than the second data transmission rate; and responsive to a determination that the third data transmission rate is less than the second data transmission rate, set the beacon frame data transmission rate to the third data transmission rate.

25. The device of claim 23, wherein the wireless networking control unit is further configured to:

determine that the third data transmission rate is greater than the second data transmission rate;

determine that a fourth data transmission rate is the lowest data transmission rate used by the plurality of client devices, wherein the fourth data transmission rate is greater than the second data transmission rate; and responsive to a determination that the third data transmission rate is greater than the second data transmission rate and a determination that the fourth data transmission rate is the lowest data transmission rate used by the plurality of client devices, set the beacon frame data transmission rate to the fourth data transmission rate.

26. The device of claim 14, wherein the wireless networking protocol defines a third data transmission rate, wherein the third data transmission rate is greater than the second data transmission rate, wherein at least one client device of the plurality of client devices communicates with the access point at the third data transmission rate.

27. A non-transitory machine-readable storage medium having instructions stored therein, which when executed by one or more processors causes the one or more processors to perform operations that comprise:

receiving an indication to restrict access to an access point to a plurality of client devices, wherein the plurality of client devices have wireless connections with the access point, wherein the wireless connections conform to a wireless networking protocol, wherein a first transmission rate is a lowest transmission rate defined by the wireless networking protocol;

responsive to said receiving the indication to restrict access to the access point to the plurality of client devices,
determining client devices that comprise the plurality of client devices; and
restricting access to the access point to the plurality of client devices;

determining, at the access point, that a second data transmission rate is used between a first client device of the plurality of client devices and the access point, wherein the second data transmission rate is a lowest data transmission rate used by the plurality of client devices, wherein the second data transmission rate is greater than the first data transmission rate; and responsive to said determining that the second data transmission rate is the lowest data transmission rate used by the plurality of client devices, setting, at the access point, a beacon frame data transmission rate to the second data transmission rate, wherein said determining the client devices that comprise the plurality of client devices comprises determining a plurality of connected client devices, wherein a connected client device is a client device having a wireless connection with the access point, wherein the plurality of connected client devices comprises the plurality of client devices.

28. The non-transitory machine-readable storage medium of claim 27, wherein the operations further comprise transmitting a beacon frame at the second data transmission rate.

29. The non-transitory machine-readable storage medium of claim 27, wherein the operations further comprise ignoring a frame from a client device that is not a client device of the plurality of client devices.

30. The non-transitory machine-readable storage medium of claim 27, wherein the operations further comprise determining that one client device of the plurality of client devices is no longer connected.

31. The non-transitory machine-readable storage medium of claim 30, wherein the operations further comprise setting the beacon frame data transmission rate to the first data transmission rate responsive to said determining that one client device of the plurality of client devices is no longer connected.

32. The non-transitory machine-readable storage medium of claim 31, wherein the operations further comprise: receiving an indication that an option of a plurality of options was selected, wherein each option of the plurality of options corresponds to an action for reconfiguring the access point in response to determining one client device of the plurality of client devices is no longer connected;

wherein said setting the beacon frame data transmission rate to the first data transmission rate is responsive to said receiving the indication that the option of the plurality of options was selected.

33. The non-transitory machine-readable medium of claim 30, wherein the operations further comprise setting the beacon frame data transmission rate to a third data transmission rate responsive to said determining that one client device of the plurality of client devices is no longer connected, wherein the third data transmission rate is greater than the second data transmission rate.

34. The non-transitory machine-readable storage medium of claim 33, wherein the operations further comprise: receiving an indication that an option of a plurality of options was selected, wherein each option of the plurality of options corresponds to an action for reconfiguring the access point in response to determining one client device of the plurality of client devices is no longer connected;
  wherein said setting the beacon frame data transmission rate to the third data transmission rate is responsive to said receiving the indication that the option of the plurality of options was selected.

35. The non-transitory machine-readable storage medium of claim 30, wherein the operations further comprise generating a notification that one client device of the plurality of client devices is no longer connected.

36. The non-transitory machine-readable storage medium of claim 27, wherein the operations further comprise receiving an indication that a data transmission rate between one of the plurality of client devices and the access point has changed to a third data transmission rate, wherein the third data transmission rate is one of a plurality of data transmission rates defined by the wireless networking protocol.

37. The non-transitory machine-readable storage medium of claim 36, wherein the operations further comprise: determining that the third data transmission rate is less than the second data transmission rate; and responsive to said determining that the third data transmission rate is less than the second data transmission rate, setting the beacon frame data transmission rate to the third data transmission rate.

38. The non-transitory machine-readable storage medium of claim 36, wherein the operations further comprise: determining that the third data transmission rate is greater than the second data transmission rate; determining that a fourth data transmission rate is the lowest data transmission rate used by the plurality of client devices, wherein the fourth data transmission rate is greater than the second data transmission rate; and responsive to said determining that the third data transmission rate is greater than the second data transmission rate and said determining that the fourth data transmission rate is the lowest data transmission rate used by the plurality of client devices, setting the beacon frame data transmission rate to the fourth data transmission rate.

39. The non-transitory machine-readable storage medium of claim 27, wherein the wireless networking protocol defines a third data transmission rate, wherein the third data transmission rate is greater than the second data transmission rate, wherein at least one client device of the plurality of client devices communicates with the access point at the third data transmission rate.

\* \* \* \* \*